G. J. MARTEL.
TIRE PATCHING DEVICE.
APPLICATION FILED JUNE 5, 1911.
1,057,440.
Patented Apr. 1, 1913.
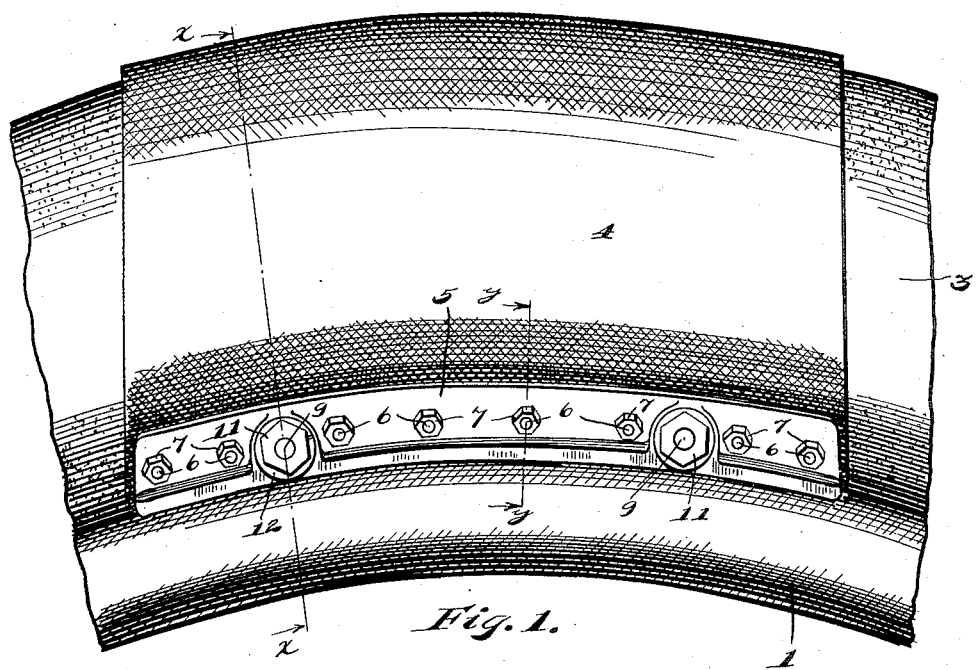
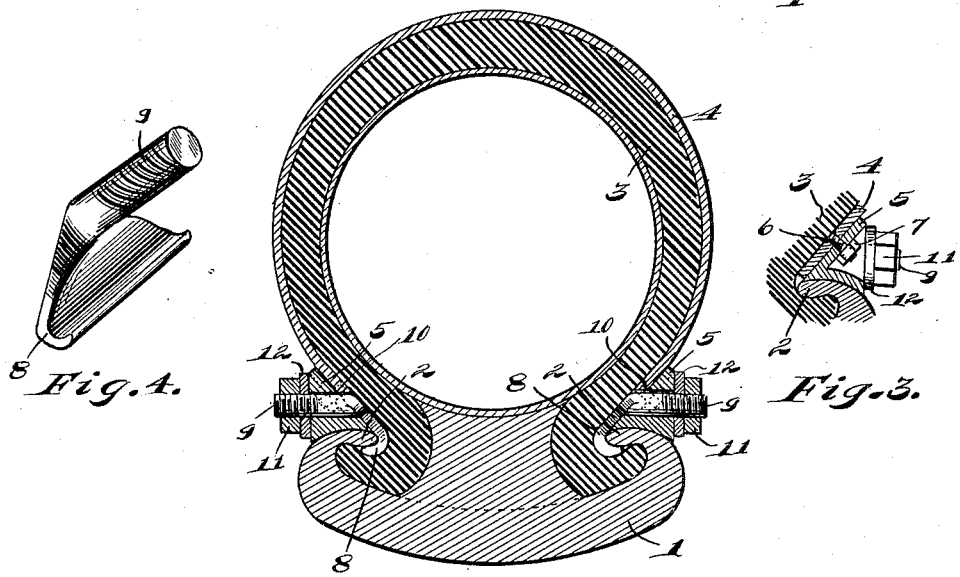

UNITED STATES PATENT OFFICE.

GUSTAVE J. MARTEL, OF CHICAGO, ILLINOIS.

TIRE-PATCHING DEVICE.

1,057,440. Specification of Letters Patent. Patented Apr. 1, 1913.

Application filed June 5, 1911. Serial No. 631,275.

*To all whom it may concern:*

Be it known that I, GUSTAVE J. MARTEL, a citizen of the United States, and a resident of the city of Chicago, county of Cook, and State of Illinois, have invented certain new and useful Improvements in Tire-Patching Devices, of which the following is a specification.

This invention relates to improvements in patching devices for pneumatic tires and the object of this invention is to provide a device of this character which shall be of extremely simple construction, hence of low cost to manufacture, and also a device which may be readily and expeditiously applied to a tire or removed therefrom; and further, a patching device which will be of great efficiency in use.

Other objects will appear hereinafter.

With these objects in view my invention consists in the tire patching construction which will be hereinafter described and more particularly pointed out in the appended claim.

My invention will be more readily understood by reference to the accompanying drawings forming a part of this specification, and in which, Figure 1 is a side elevation of a fragment of a pneumatic tire and rim to which is applied a patching device embodying my invention, Fig. 2 is a transverse section taken on line $x$—$x$ of Fig. 1, Fig. 3 is a fragmentary sectional detail taken on substantially line $y$—$y$ of Fig. 1, and Fig. 4 is a detail perspective of one of the securing hook members embodied in the invention, detached.

Referring now to the drawings I have illustrated therein the usual clencher rim 1 having the engaging or clenching flanges 2 at its respective edges. Mounted upon the rim 1 is a pneumatic tire 3 of ordinary type, said tire being secured in position on said rim by means of the flanges 2 in the usual manner. Arranged about the tread portion of the tire 3 is the patching strap 4 which is formed of any suitable, durable, flexible material, leather or raw hide being preferably employed. The strap 4 may be of any width desired so as to adapt the same to effectually serve the purpose for which it is designed, said strap being of a length such that when the same is arranged about the tire, with the latter in inflated condition, said strap will extend substantially from one of the flanges 2 to the other, as clearly shown in Fig. 2. Arranged at the respective extremities of the strap 4 are similar bars or yokes 5 which are secured rigidly in position by means of screws 6 and nuts 7. Said bars 5 are of bowed form to conform with the curvature of the rim, the inner or under sides of said bars being shaped to conform with the conformation of the adjacent surfaces of the rim flanges 2. Also, it will be observed, that the bars 5 are so formed that when arranged in operative position upon the outer sides of the flanges 2 the portions thereof to which the extremities of the strap 4 are secured are disposed substantially parallel with the adjacent sides of the tire 3 and so that the ends of the strap 4 will be held in snug engagement with the adjacent surfaces of said tire.

The bars 5 and hence the strap 4 are secured in operative position by means of hook members 8 the inner ends of which are adapted to engage over the inner edges of the engaging flanges 2, as clearly shown in Fig. 2. The hooks 8 are provided with outwardly projecting threaded shanks 9 which loosely engage perforations 10 formed for the reception thereof in the bars 5. Nuts 11 threaded upon the outer ends of the shanks 9 serve evidently to secure the bars 5 in operative position, nut-locks 12 of any approved design being preferably employed in order to lock said nuts in position. In attaching the tire patch it is required that the tire be first deflated. With the tire in deflated condition, the hook members 8 may readily be arranged in engagement with the flanges 2. When said members 8 are so arranged the strap 4 is placed upon the tire and the bars 5 at the extremities thereof slid to position upon the outwardly projecting shanks 9 of the hooks 8. This being done the nut-locks 12 and the nuts 11 are then arranged in position thereby completing the steps necessary for attaching the device. After the latter has been arranged as described the tire is inflated, the strap 4, upon such inflation, being tightened about the tire because of the expansion of the latter, serving to effectually reinforce said tire at the place of application. Should the strap 4 stretch so that the same no longer snugly fits the tire, one of the bars 5 may be removed and said strap shortened to the proper length and the bar 5 resecured.

A tire patching device as set forth is of extremely economical construction hence may be manufactured at a low cost, the same being adapted when applied to a tire to effectually serve to strengthen the same.

While I have illustrated and described the preferred construction for carrying my invention into effect, I do not wish to be limited thereto as there might be various changes made in the details of construction and the arrangements of parts without departing from the spirit of the invention as comprehended within the scope of the appended claim.

Having described my invention what I claim as new and desire to secure by Letters Patent is:

In a tire patching device, the combination of a flexible patching strap; angular yokes having one leg secured to the ends of said strap, the other leg being curved to fit a rim flange; securing hooks adapted to engage rim flanges and having threaded shanks extending through said yokes; and nuts on said shanks, substantially as described.

In testimony whereof I have signed my name to this specification in the presence of two subscribing witnesses.

GUSTAVE J. MARTEL.

Witnesses:
CATHERN MAGUIRE,
M. JOHNSON.

Copies of this patent may be obtained for five cents each, by addressing the "Commissioner of Patents, Washington, D. C."